Patented Sept. 29, 1942

2,297,628

UNITED STATES PATENT OFFICE 2,297,628

RECOVERY OF WASTES FROM GLASS GRINDING AND POLISHING OPERATIONS

Rob Roy McGregor, Swissvale, Pa., assignor to Norbert S. Garbisch, Butler, Pa.

No Drawing. Original application April 13, 1937, Serial No. 136,699, now Patent No. 2,182,384, dated December 5, 1939. Divided and this application December 4, 1939, Serial No. 307,413

8 Claims. (Cl. 23—110)

The present invention relates to the preparation of alkali silicates and it has particular relation to the preparation of sodium silicate.

One object of the invention is to provide a simple and economical process of forming sodium silicate and simultaneously to provide silica of high purity and in a very fine state of sub-division.

This and other objects will be apparent from consideration of the following specification and the accompanying claims.

In the manufacture of plate glass, the plates as initially obtained have relatively rough surfaces which for many purposes are objectionable. It is customary to subject such plates to a grinding or surfacing operation in order to remove the objectionable irregularities and to provide substantially smooth, plane surfaces.

This operation is conducted by cementing the plates with plaster of Paris to moving tables or cars which are passed successively under a series of revolving cast iron blocks or runners while granular silica (i. e. sand) is fed under the runners as a water suspension or abrasive mixture to grind away the irregularities.

In the preparation of batch employed in the manufacture of glass, sand of great purity and containing only a fraction of a per cent of iron is commonly employed. Such sand is relatively expensive and for that reason is seldom used in the grinding operation, but instead is replaced by cheaper and relatively impure river sands which initially contain many impurities, such as iron compounds and the like often in intimate association with the silica.

The relatively coarse sand initially employed in roughing off the surface of the glass gradually becomes broken and worn down during the course of operations. At the same time, becomes charged with fine flakes or chips of glass and iron which respectively are abraded from the surface of the glass and the iron grinding discs or runners. During operations, the sand is subjected from time to time to a classifying operation in any convenient form of apparatus in order to separate relatively fine particles from the coarser particles. The coarse material is then returned for use in making the coarser cuts upon the glass surface. The fine material is advanced to a later stage and used for smoothing up the partially ground surfaces. Ultimately the sand is ground to such fine state of sub-division and is so contaminated with iron and other impurities originally present in the sand, iron abraded from the runners, rouge, fine glass chips from the glass, gypsum from the polishing tables, oil from the machinery, dust from the factory, and other materials that it can no longer be used for grinding operations.

Typically, the discarded sand is of the following composition:

| | Per cent |
|---|---|
| Sand grains | 70–85 |
| Glass debris | 15–25 |
| Gypsum | 0.3–7 |
| Rouge | 0.2–0.5 |
| Metallic iron | 1–2.5 |
| Organic matter | Trace |

This impure material has heretofore been finally discarded as useless waste, either by dumping it into a stream or by piling it upon any available land adjacent the factory. Either mode of disposal is highly objectionable. In case the material is allowed to run to waste in a stream or other body of water, contamination, of course, results. This in many cases is prohibited by law. The volume of sand employed in grinding plate glass is very great and it usually exceeds the amount of sand employed in the compounding of the glass. Accordingly, it is evident that an immense volume of waste is produced and if it is simply piled up, in course of time, much space is required for its storage.

The present invention is based upon the discovery that sand from glass grinding operations may by suitable treatment be purified of most of the objectionable impurities to produce a finely ground silica of great value for many purposes.

If sand of high purity, e. g. melting sand, is used for grinding operations, iron, the major portion of which is metallic iron abraded from the runners, is the most objectionable material and is usually present in amounts of about 1 to 2.5% based upon solids content. One convenient method of removing the iron involves subjecting the wastes from the polishing operations to the action of a magnetic separator. By this method, most of the free iron resulting from abrasion of the grinding discs is removed. In the event magnetic separation is employed, the operation should succeed the conclusion of the grinding operations as promptly as possible in order to obviate excessive oxidation of the finely ground iron. The residual non-magnetic oxides or other compounds of iron may be removed by digestion of the slurry or sludge of finely divided sand with an acid, such as hydrochloric acid, sulphuric acid, tartaric acid, nitric acid, or the like following by washing to remove the resultant soluble iron compounds.

A third method of removing particles of iron and iron oxide involves froth flotation. In this operation, a selective promoter of flotation which will increase the flotability of the particles of iron is employed. If desired, the iron may be given preliminary treatment in order to increase its flotability. Such treatment includes conventional sulfidation. It also includes treatment of the slurry of impure sand with copper sulphate presumably in order to deposit thin films of copper upon the surfaces of the particles of iron. The copper coated particles may then be floated without difficulty in the same manner as copper. The copper coated particles may also be given sulfide treatment with a soluble sulfide, such as sodium sulfide, hydrogen sulfide or the like. The flotation is then effected by methods similar to those employed in the concentration of low grade ores of metal, for example, a frothing agent, such as pine oil or the like, together with a flotation promoter, such as xanthate, mercaptobenzothiazol, or the like are added and the slurry is then blown with air to form a froth which carries most of the iron.

The removal of the iron by chlorination is also contemplated as being within the purview of the invention. In such method, the waste sand is preliminarily freed of water by conventional methods and then exposed to the action of chlorine gas at a fairly high temperature; e. g., 1400 to 1800 deg. F. Chlorination of the iron to form iron chloride results and the latter at the temperature of operation is volatilized and leaves the silica and other relatively inert materials in substantially iron-free state. Two or more of these methods may be combined. For example, the major portion of the metallic iron may be removed magnetically, or by froth flotation and any residue of iron or iron compounds then removed by digestion with acid.

The operations involved in the acid purification of a waste grinding sand may be summarized as follows:

1. Collect the slurry from grinding operations in large tank or other suitable container.
2. Allow the slurry to settle and decant the clear liquid. The water content is thus reduced from 90 per cent to 50 per cent.
3. Agitate the thickened slurry in the same tank or in a smaller tank as may be convenient with an acid (i. e. hydrochloric or sulfuric). Enough acid is usually added to give an acid concentration of about 5 per cent.
4. Wash sand preferably by decantation.
5. Separate sand from water; e. g. by filtration.
6. Dry finely divided product.

If removal of all or a part of gypsum and the glass constituents, such as calcium, silica and sodium is desired, the process should also include treatment of the waste sand with an alkali, such as sodium carbonate or sodium hydroxide; sodium silicate may, also, be employed. In such process, if the concentration of the alkali is properly regulated, the glass is preferentially attacked and is either dissolved or is so opened up that the sodium and calcium compounds may be washed out with water or with dilute acid. Any silica from the glass remaining apparently comprises porous frangible particles or skeletons. If the concentration of the alkali is maintained relatively low, e. g. about 5% of sodium hydroxide or 10% of sodium carbonate, the ground silica is not substantially attacked. It thus becomes possible to obtain a product consisting of practically pure silica in a very fine state of subdivision and of great value for commercial application. In such process, the metallic iron may if desired be removed as a preliminary step. This has been done with an electro-magnet, or by dissolving it in acid, hydrochloric or nitric acids, for example, being satisfactory. The iron may also be removed by "flotation."

After removal of the major part of the metallic iron, it is preferable to reduce the amount of water in which the waste is suspended (from about 90 per cent) to about 50 per cent. This is not necessary, but is saving of chemicals in subsequent treatment.

The second major step consists in treating the waste with caustic alkali or alkali carbonate. Caustic soda or sodium carbonate are satisfactory. This operation is conducted in a suitable vessel and may be effected at normal "room" temperatures, or the temperature may be elevated, depending upon conditions. At lower temperatures the reactions proceed more slowly but the advantage of more rapid action at higher temperatures is offset by the greater cost. Naturally, in cold weather practical expediency will require heating. It is advisable also to provide means of stirring this reaction mixture, to insure contact between the alkali and each solid particle of the mass.

At temperatures attainable in open vessels concentrations of 5 per cent of caustic soda or 10 per cent of sodium carbonate are satisfactory. Higher concentrations may be used (e. g. 10 per cent caustic soda or 15 per cent sodium carbonate). However, as the concentration increases there is an increasing tendency to dissolve silica as well as glass. Substantial reduction of the concentration results in material slowing up of the reaction. At higher temperatures, such as may be attained by conducting the reaction in an autoclave, lower concentrations may be employed.

A variation of the alkali treatment involves simple digestion of the waste sand with water in an autoclave at a fairly high temperature, e. g., that corresponding to steam under 150 or 200 pounds pressure per square inch. As a result, a part of the alkali from the glass is hydrolized and then tends further to break down the latter. A small amount of additional alkali may also be incorporated if desired.

Several chemical reactions occur in this alkaline treatment. For example, if sodium carbonate is the alkali used, the gypsum ($CaSO_4.2H_2O$) is decomposed to form calcium carbonate ($CaCO_3$) and sodium sulphate ($Na_2SO_4$). (The sodium sulphate is soluble in water and is removed by the subsequent washing and the calcium carbonate is later dissolved in acid and likewise removed.)

The alkali also reacts chemically with the fine particles of glass in the waste. The chemical reactions involved appear to be complex but the major soluble product seems to be sodium silicate and it is evident that this is formed chiefly from the silica of the glass.

After this alkaline treatment, the material is filtered or allowed to settle and the solution decanted. The residue is washed with water to remove as much as is practicable of the soluble materials. The solution contains slight excess of the alkaline reagent, a considerable amount of sodium silicate and most or all of the sulphate (derived from the gypsum) in the form of sodium sulphate. This solution may be concentrated, and use made of the sodium silicate, which, for example is suitable for briquetting the glass batch, and other commercial applications.

This is a division of application Serial No. 136,699, filed April 13, 1937, by Rob Roy McGregor, issuing December 5, 1939, as Patent No. 2,182,384.

What I claim is:

1. A method of selectively removing finely ground glass from a mixture of pulverulent sand and glass resulting from the smoothing of glass surfaces with sand as an abrasive, which method comprises treating the mixture with aqueous caustic soda of from about 5 to 10 percent concentration for a period of time sufficient preferentially to react with the glass content to form a water solution of sodium silicate while leaving most of the sand unattacked and then removing the solution from the insoluble residues.

2. A method of removing finely ground glass from a mixture of pulverulent glass and sand resulting from the surfacing of glass plates with a slurry of sand as an abrasive, which method comprises treating the mixture with carbonate of soda of about 5 to 15 percent concentration for a period of time sufficient preferentially to react the glass content to form a water solution of sodium silicate, while leaving most of the sand unattacked, then removing the resultant solution of sodium silicate from the insoluble residue.

3. A process of removing finely ground glass from the mixture of pulverulent glass and silica resulting from the surfacing of glass plates with sand as an abrasive, which process comprises digesting the mixture with hot water under pressure in an autoclave to form sodium silicate solution from the glass, then removing the solution from the residue of silica and insoluble glass constituents.

4. A process of forming sodium silicate comprising digesting with a dilute water solution of alkali, the mixture of finely-divided sand and glass resulting from the surfacing of plate glass with a water slurry of sand as an abrasive for a time sufficient to effect selective reaction of the alkali with the glass content of the mixture to form alkali silicate while leaving most of the sand unattacked.

5. A process of forming sodium silicate, which process comprises digesting with a water solution of soda ash of not greater than about 15 percent concentration the finely-divided and thoroughly admixed sand and glass resulting from the grinding of plate glass with a slurry of sand as an abrasive for a period of time sufficient selectively to react with the glass content of the mixture to form a water solution of sodium silicate while leaving the sand content substantially unreacted.

6. A process of forming sodium silicate, which process comprises treating a finely-divided and very intimate mixture of sand and glass resulting from the grinding of glass plates with a slurry of sand of glass batch purity as an abrasive, in order to remove finely-divided iron resulting from the grinding operation, then digesting the mixture with a dilute water solution of alkali to obtain selective reaction of the glass content to form a solution of sodium silicate, while leaving the finely divided sand substantially unattacked, then removing the solution from the unreacted residue.

7. A process of forming sodium silicate, which process comprises digesting the finely-divided and thoroughly distributed mixture of sand and glass resulting from the grinding of plate glass with a slurry of sand of glass batch purity as an abrasive with relatively dilute aqueous sodium hydroxide for a period of time sufficient to obtain selective reaction of the glass content without substantial attack upon the sand content.

8. A process comprising digesting a mixture of sand and glass, resulting from the abrasion of glass plates with sand as a water slurry until the sand is broken down to a pulverulent state, with a medium from the group consisting of water at superatmospheric pressure and elevated temperature and alkaline solutions, for a period of time sufficient to preferentially react with the glass content of the mixture to form alkali silicates from the glass while leaving the sand unattacked, and then removing the resultant solution of alkali silicate from the siliceous residue.

ROB ROY McGREGOR.